United States Patent [19]
Bonk et al.

[11] Patent Number: 6,082,025
[45] Date of Patent: Jul. 4, 2000

[54] FLEXIBLE MEMBRANES

[75] Inventors: Henry W. Bonk, Wallingford, Conn.; David J. Goldwasser, Hillsboro; Paul H. Mitchell, Portland, both of Oreg.

[73] Assignee: Nike, Inc., Beaverton, Oreg.

[21] Appl. No.: 09/151,837

[22] Filed: Sep. 11, 1998

[51] Int. Cl.⁷ .......................... A43B 13/18; B32B 27/00
[52] U.S. Cl. ................... 36/29; 36/28; 428/35.2; 428/36.7; 428/216; 428/220; 428/336; 428/423.3; 428/423.5; 428/423.7; 428/424.2; 428/424.4; 428/424.7; 428/424.8; 428/475.2; 428/476.1; 428/476.9; 428/483; 428/518; 428/520; 428/521
[58] Field of Search .................. 428/35.2, 36.6, 428/36.7, 212, 220, 339, 216, 336, 423.1, 423.5, 423.7, 424.2, 424.4, 424.7, 424.8, 476.1, 476.9, 483, 518, 520, 521, 423.3, 475.2; 36/29, 28; 473/609; 138/26, 30; 152/511

[56] References Cited

U.S. PATENT DOCUMENTS

| | | | |
|---|---|---|---|
| 3,557,265 | 1/1971 | Chisholm et al. | 264/46.1 |
| 3,565,985 | 2/1971 | Schrenk et al. | 264/171.27 |
| 3,711,176 | 1/1973 | Alfrey, Jr. et al. | 359/359 |
| 4,513,058 | 4/1985 | Martin | 428/336 |
| 4,937,134 | 6/1990 | Schrenk et al. | 428/213 |
| 5,036,110 | 7/1991 | Moureaux | 521/137 |
| 5,094,788 | 3/1992 | Schrenk et al. | 264/173.15 |
| 5,094,793 | 3/1992 | Schrenk et al. | 264/173.15 |
| 5,096,756 | 3/1992 | Walters | 428/35.5 |
| 5,103,337 | 4/1992 | Schrenk et al. | 359/359 |
| 5,122,322 | 6/1992 | Momose | 264/171.21 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,194,306 | 3/1993 | Blatz | 428/35.4 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,240,525 | 8/1993 | Percec et al. | 156/60 |
| 5,262,894 | 11/1993 | Wheatley et al. | 359/586 |
| 5,269,995 | 12/1993 | Ramanathan et al. | 264/173.12 |
| 5,278,694 | 1/1994 | Wheatley et al. | 359/359 |
| 5,279,873 | 1/1994 | Oike | 428/35.4 |
| 5,316,703 | 5/1994 | Schrenk | 264/1.34 |
| 5,319,022 | 6/1994 | Fukada et al. | 525/57 |
| 5,339,198 | 8/1994 | Wheatly et al. | 359/359 |
| 5,353,154 | 10/1994 | Lutz et al. | 359/582 |
| 5,356,990 | 10/1994 | Pucci | 525/57 |
| 5,393,832 | 2/1995 | Moulies et al. | 525/57 |
| 5,575,871 | 11/1996 | Ryoshi et al. | 156/78 |
| 5,681,627 | 10/1997 | Mueller | 428/35.2 |
| 5,693,412 | 12/1997 | Walters | 428/317.1 |
| 5,736,207 | 4/1998 | Walther et al. | 428/36.7 |
| 5,952,065 | 9/1999 | Mitchell et al. | 428/36.7 |

OTHER PUBLICATIONS

W. Schrenk and J. Wheatley, "Coextruded Elastomeric Optical Interference Film," 1988, pp. 1703–1707, *Conference Proceedings of Society of Plastic Engineers 46th Annual Technical Conference*.

"Antec Report", Plastics Technology, Jul. 1993, pp. 13–14.

Walter J. Schrenk, John A. Wheatley, Ray A. Lewis, and Charles B. Arends, "Nanolayer Polymeric Optical Films", Jun. 1992, Tappi Journal, pp. 169–174.

*Primary Examiner*—Rena L. Dye
*Attorney, Agent, or Firm*—Harness, Dickey & Pierce P.L.C.

[57] ABSTRACT

Described is a membrane comprising a microlayer polymeric composite having at least about 10 microlayers. The microlayers are each individually up to about 100 microns thick and alternate between at least one gas barrier material and at least one elastomeric material. The membrane can be formed into a pressurized bladder or cushioning device for many applications, including footwear and hydropneumatic accumulators.

37 Claims, 9 Drawing Sheets

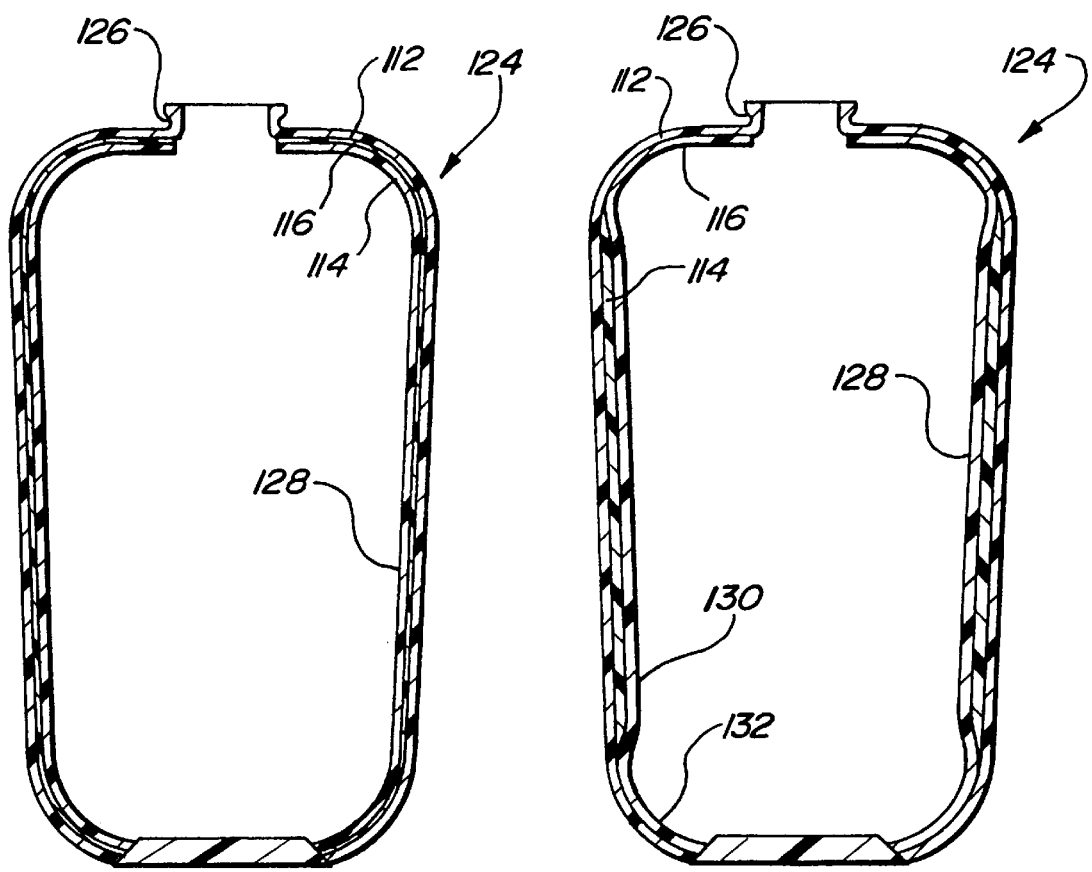

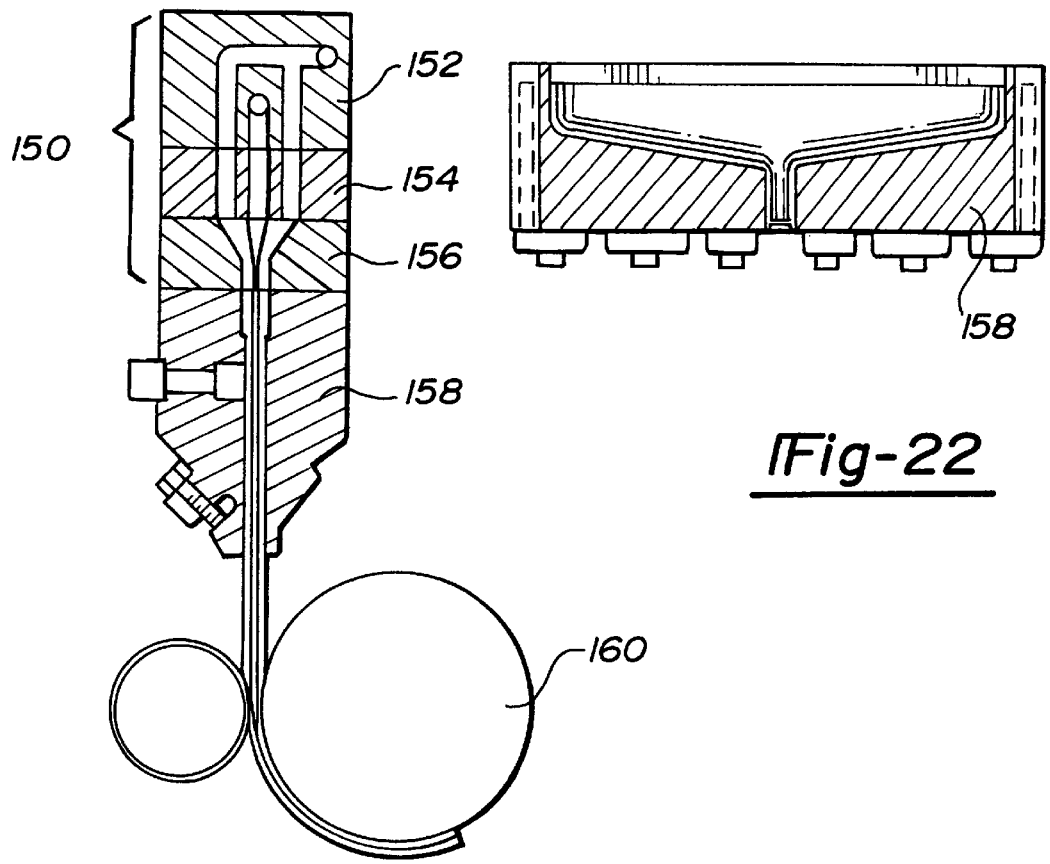
*Fig-22*
*Fig-21*
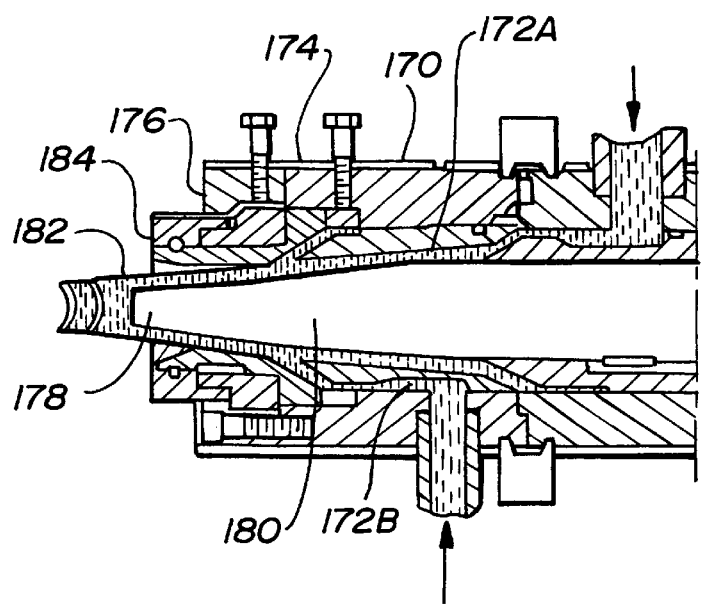
*Fig-23*

FLEXIBLE MEMBRANES

FIELD OF THE INVENTION

The present invention concerns membranes suitable for applications that require both barrier properties and flexibility. The membranes of the invention are particularly useful in construction of pressurized bladders, including cushioning devices. The membranes of the invention are elastic and have very low gas transmissions rates for nitrogen and other gasses that can be used to inflate the bladders and cushioning devices. The present invention further relates to footwear that includes one or more bladders or cushioning devices of the invention.

BACKGROUND OF THE INVENTION

Thermoplastic and thermoset polymeric materials have been widely used in membranes for their fluid (gas or liquid) barrier properties. Such fluid barrier films are used, for example, for plastic wrap materials and for other packaging materials. Another common application for polymeric materials with good fluid barrier properties is in the construction of inflatable bladders.

Inflatable bladders have been used in a variety of products such as vehicle tires, balls, accumulators used on heavy machinery, and in footwear, especially shoes, as cushioning devices. It is often desirable to use polymeric materials that are thermoplastic because thermoplastic materials may be reclaimed and reformed into new articles, thus reducing waste during manufacturing operations and promoting recycling after the life of an article. While thermoplastic barrier films may be flexed to a certain extent due to their thinness, thermoplastic barrier films do not generally have sufficient elasticity for many applications. Elastic materials, or elastomers, are able to substantially recover their original shape and size after removal of a deforming force, even when the part has undergone significant deformation. Elastomeric properties are important in many applications, including inflatable bladders for footwear and hydraulic accumulators.

Footwear, and in particular shoes, usually include two major components, a shoe upper and a sole. The general purpose of the shoe upper is to snuggly and comfortably enclose the foot. Ideally, the shoe upper should be made from an attractive, highly durable, comfortable materials or combination of materials. The sole, constructed from a durable material, is designed to provide traction and to protect the foot during use. The sole also typically serves the important function of providing enhanced cushioning and shock absorption during athletic activities to protect the feet, ankles, and legs of the wearer from the considerable forces generated. The force of impact generated during running activities can amount to two or three times the body weight of the wearer, while other athletic activities such as playing basketball may generate forces of between six and ten times the body weight of the wearer. Many shoes, particularly athletic shoes, now include some type of resilient, shock-absorbent material or components to cushion the foot and body during strenuous athletic activity. These resilient, shock-absorbent materials or components are commonly referred to in the shoe manufacturing industry as the midsole. Such resilient, shock-absorbent materials or components can also be applied to the insole portion of the shoe, which is generally defined as that portion of the shoe upper directly underlying the plantar surface of the foot.

Gas-filled bladders may be used for midsoles or inserts within the soles of shoes. The gas-filled bladders are generally inflated to significant pressures in order to cushion against the forces generated on the foot during strenuous athletic activities. Such bladders typically fall into two broad categories, those that are "permanently" inflated, such as disclosed in Rudy, U.S. Pat. No. 4,183,156 and 4,219,945, and those using a pump and valve system, such as those disclosed in Huang, U.S. Pat. No. 4,722,131.

Athletic shoes of the type disclosed in U.S. Pat. No. 4,183,156 having "permanently" inflated bladders have been sold under the trademark "Air-Sole" and other trademarks by Nike, Inc. of Beaverton, Oreg. Permanently inflated bladders of such shoes are constructed using an elastomeric thermoplastic material that is inflated with a large molecule gas that has a low solubility coefficient, referred to in the industry as a "super gas." Gases such as SF6, $CF_4$, $C_2F_6$, $C_3F_8$, and so on have been used in this way as super gases. Super gases are costly, however, and so it is desirable to provide permanent inflation with less expensive gasses like air or nitrogen. By way of example, U.S. Pat. No. 4,340,626 entitled "Diffusion Pumping Apparatus Self-Inflating Device" which issued Jul. 20, 1982, to Rudy, which is expressly incorporated herein by reference, discloses selectively permeable sheets of film that are formed into a bladder and inflated with a gas or mixture of gases to a prescribed pressure. The gas or gases utilized ideally have a relatively low diffusion rate through the selectively permeable bladder to the exterior environment while gases contained in the atmosphere, such as nitrogen, oxygen, and argon, have a relatively high diffusion rate are able to penetrate the bladder. This produces an increase in the total pressure within the bladder, by the addition of the partial pressures of the nitrogen, oxygen and argon from the atmosphere to the partial pressures of the gas or gases with which the bladder is initially inflated. This concept of a relative one-way addition of gases to enhance the total pressure of the bladder is now known as "diffusion pumping."

Many of the earlier midsole bladders used in the footwear manufacturing industry prior to and shortly after the introduction of the Air-Solem athletic shoes consisted of a single layer gas barrier type film made from polyvinylidene chloride-based materials such as Saran® (which is a registered trademark of the Dow Chemical Co.) and which by their nature are rigid plastics, having relatively poor flex fatigue, heat sealability and elasticity. Composite films of two gas barrier materials have also been used. Momose, U.S. Pat. No. 5,122,322, incorporated herein by reference, describes a film of a first thermoplastic resin having a plurality of continuous tapes of a second thermoplastic resin that lie parallel to the plane of the film. The first thermoplastic resin is selected from polyolefin, polystyrene, polyacrylonitrile, polyester, polycarbonate, or polyvinyl chloride resins and modified resins. The second resin may be a polyamide, saponified ethylene vinyl acetate copolymer, ethylene-vinyl alcohol copolymer, polyvinylidene chloride, or polyacrylonitrile copolymer. The film is formed by extruding the first resin from a first extruder and the second resin from a second extruder, introducing both extrudate streams simultaneously into a static mixer in which the layers (tapes) are formed. The film may have one or two outer films laminated to it. While these films are disclosed to have an oxygen permeation rate of 0.12 to 900 cc/$m^2$-day-atm at 20° C., making them generally suitable for forming cushioning material for packaging and shipping material, the films are not resilient or flexible enough for cushioning bladders for footwear.

Additional laminates of two different kinds of barrier materials, in which the laminate has a large number of relatively thin layers of the different materials, have been disclosed. Schrenk et al., U.S. Pat. No. 3,565,985, 4,937,134, 5,202,074, 5,094,788, and 5,094,793, 5,380,479, 5,540,878, 5,626,950; Chisolm et al., U.S. Pat. No. 3,557,265; Ramanathan et al., and U.S. Pat. No. 5,269,995, all of which are incorporated herein by reference (including the references cited therein), disclose methods of preparing multilayer films (at least about 10 layers) using streams of at least two different thermoplastics. The streams of molten thermoplastic resin are combined in a layered stream and then directed through a layer multiplying means to provide the multilayer film. The multilayering described in these patents is used to create the iridescent films. In order to create the iridescent effect, the layers responsible for the iridescence must have a thickness of 0.05 micron to 5 microns. The different thermoplastic materials are chosen to have a maximum difference in refractive index to achieve maximum iridescence in the multilayer film. The gas barrier materials do not produce films capable of absorbing repeated impacts without deformation or fatigue failure as is required for membranes of an inflatable bladder or a cushioning device.

Known bladder films that are composites or laminates can also present a wide variety of problems in shoe bladders, such as layer separation, peeling, gas diffusion or capillary action at weld interfaces, low elongation leading to wrinkling of the inflated product, cloudy appearing finished bladders, reduced puncture resistance and tear strength, resistance to formation via blow-molding and/or heat-sealing and RF welding, high cost processing, and difficulty with foam encapsulation and adhesive bonding, among others. Some previously known multi-layer bladders used tie-layers or adhesives in preparing laminates in order to achieve interlayer bond strength high enough to avoid the problems mentioned. The use of such tie layers or adhesives, however, generally prevents regrinding and recycling of any waste materials created during product formation back into an usable product, making manufacturing more expensive and producing more waste. Use of adhesive also increases the cost and complexity of preparing laminates. These and other perceived short comings of the prior art are described in more extensive detail in U.S. Pat. Nos. 4,340,626; 4,936,029 and 5,042,176, each of which are hereby expressly incorporated by reference.

Besides combinations of two gas barrier layers, composites may be formed from layers of materials having very different properties. Composites of different materials are particularly useful for footwear bladders because many requirements, sometimes contradictory, are made of the membranes used for footwear bladders. For instance, the membrane must exhibit excellent gas barrier properties as already mentioned toward both the inflationary gas and the ambient gases, while at the same time the membrane must be elastic and be resistant to fatigue failure. Materials used to construct footwear bladders must further be resistant to degradation from the fluids contained and from the environment to which the footwear is exposed. The problem of diverse and sometimes contradictory property requirements for membranes or films of this sort has commonly been addressed by creating laminates of at least two layers of distinct materials, one layer providing the durable flexibility of an elastomer, one the other providing the fluid barrier property.

One approach has been to react or blend together at least two distinct materials to allow each of the different materials to make its respective contributions to the properties of the grafted copolymer or blend layer. Moureaux, U.S. Pat. No. 5,036,110, incorporated herein by reference, is an example of a grafted copolymer composition. Moureaux discloses a resilient membrane for a hydropnuematic accumulator that includes a film of a graft copolymer of a thermoplastic polyurethane and an ethylene vinyl alcohol copolymer. The ethylene vinyl alcohol copolymer is from 5 to 20% of the graft copolymer. The ethylene vinyl alcohol copolymer is dispersed in the polyurethane polymer and there is some grafting between the two polymers. The graft copolymer forms islands of ethylene vinyl alcohol copolymer in the polyurethane matrix. The film is a center layer between two layers of thermoplastic polyurethane in the membrane of the hydropnuematic. While the nitrogen permeation rate is reduced as compared to unmodified polyurethane, a matrix film that includes particles of gas barrier resin does not offer a gas transmission rate as low as for a composite film that has a continuous layer of the fluid barrier material.

In an alternate approach, laminates have been described that eliminate adhesive tie layers by providing membranes including a first layer of a thermoplastic elastomer, such as a thermoplastic polyurethane, and a second layer including a barrier material, such as a copolymer of ethylene and vinyl alcohol, wherein hydrogen bonding occurs over a segment of the membranes between the first and second layers. Such laminates with layers of flexible materials and layers of fluid barrier materials are described, for example, in U.S. Pat. No. 5,713,141, issued Feb. 3, 1998, incorporated herein by reference, and in copending U.S. applications Ser. No. 08/299,287, filed Aug. 31, 1994, entitled "Cushioning Device with Improved Flexible Barrier Membrane;" Ser. No. 08/684,351, filed Jul. 19, 1996, entitled "Laminated Resilient Flexible Barrier Membranes;" Ser. No. 08/475,276, filed Jun. 7, 1995, entitled "Barrier Membranes Including a Barrier Layer Employing Aliphatic Thermoplastic Polyurethanes;" Ser. No. 08/475,275, filed Jun. 7, 1995, entitled "Barrier Membranes Including a Barrier Layer Employing Polyester Polyols;" and Ser. No. 08/571,160, filed Dec. 12, 1995, entitled "Membranes of Polyurethane Based Materials Including Polyester Polyols," each of which is incorporated herein by reference. While the membranes disclosed in these references provide flexible, "permanently" inflated, gas-filled shoe cushioning components that are believed to offer a significant improvement in the art, still further improvements are offered according to the teachings of the present invention.

It is an object of the invention to provide membranes and membrane material that offer enhanced flexibility and resistance to undesirable transmission of fluids such as an inflationary gas. It is another object of the invention to provide elastic membranes for inflatable bladders that can be inflated with a gas such as nitrogen, in which the membrane provides a gas transmission rate value of about 10 cubic centimeters per square meter per atmosphere per day (cc/$m^2 \cdot atm \cdot day$) or less.

SUMMARY OF THE INVENTION

We have now discovered that inflatable bladders with improved elastomeric properties and low gas transmission rates can be formed from microlayer polymeric composites. The microlayer polymeric composites of the invention may be used to form a durable, elastomeric membrane for pressurized bladders and other cushioning devices to be used in many applications, particularly in footwear or for accumulators. By "durable" it is meant that the membrane has excellent resistance to fatigue failure, which means that the membrane can undergo repeated flexing and/or deformation and recover without delamination along the layer interfaces and without creating a crack that runs through the thickness of the membrane, preferably over a broad range of temperatures. For purposes of this invention, the term "membrane" is used to denote preferably a free-standing film separating one fluid (whether gas or liquid) from another fluid. Films laminated or painted onto another article for purposes other than separating fluids are preferably excluded from the present definition of a membrane.

The microlayer polymeric composite includes microlayers of a first polymeric material, also called the structural or elastomeric material, that provide the resiliency and flexibility and microlayers of a second polymeric material, also called the fluid barrier material, that provide the low gas transmission rate. For the same overall amount of fluid barrier material, microlayers of the non-elastomeric fluid barrier material produce a more elastomeric, more resilient membrane as compared to the laminates of the prior art with much thicker layers of the barrier material.

In particular, the present invention provides an inflatable bladder for applications such as footwear or hydraulic accumulators, the bladder having a membrane that includes at least one layer of the microlayer polymeric composite of the invention. The microlayer polymeric composite material of the invention has rubber-like or elastomeric mechanical properties provided by the structural material that allows it to repeatedly and reliably absorb high forces during use without degradation or fatigue failure. It is particularly important in applications such as footwear and hydraulic accumulator for the membrane to have excellent stability in cyclic loading. The microlayer polymeric composite material has a low gas transmission rate provided by the gas barrier material that allows it to remain inflated, and thus to provide cushioning, for substantially the expected life of the footwear or hydraulic accumulator without the need to periodically re-inflate and re-pressurize the bladder.

The nitrogen gas transmission rate of the membrane should be less than about 10 cubic centimeters per square meter per atmosphere per day (cc/m$^2$·atm·day). An accepted method of measuring the relative permeance, permeability and diffusion of different film materials is set forth in the procedure designated as ASTM D-1434-82-V. According to ASTM D-1434-82-V, permeance, permeability and diffusion are measured by the following formulas:

Permeance
(quantity of gas)/[(area)×(time)×(press. diff.)]
=Permeance (GTR)/(press. diff.)
=cc/(sq.m) (24 hr) (Pa)

Permeability
[(quantity of gas)×(film thickness)]/[(area)×(time)×(press.diff.)]
=Permeability [(GTR)×(film thick.)]/(press.diff.)
[(cc)(mil)]/[(m$^2$)(24 hr)(Pa)]

Diffusion (at one atmosphere)
(quantity of gas)/[(area)×(time)]
=Gas Transmission Rate (GTR)
cc/(m$^2$)(24 hr)

BRIEF DESCRIPTION OF THE DRAWINGS

FIG. 19 is a sectional view of a product formed from a laminated membrane according to the teachings of the present invention;

FIG. 20 is a sectional view of a second product manufactured using a laminated membrane according to the teachings of the present invention;

FIG. 21 is a side elevation view of a sheet co-extrusion assembly;

FIG. 22 is a cross-sectional view of the manifold portion of the sheet co-extrusion assembly of FIG. 22;

FIG. 23 is a side elevation view of a tubing co-extrusion assembly;

DETAILED DESCRIPTION

Figure 1:
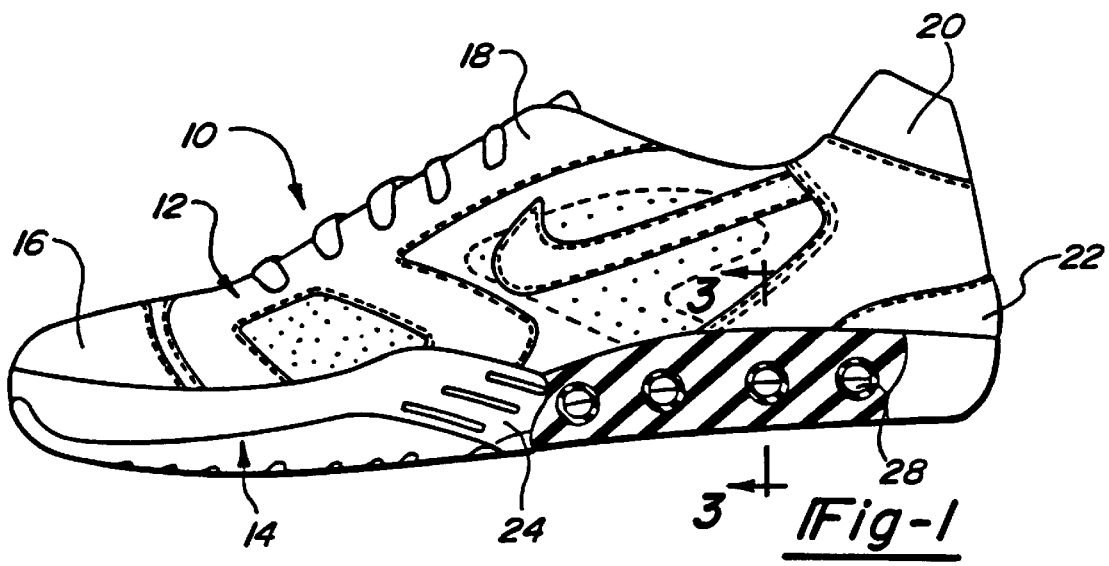
FIG. 1 is a side elevational view of an athletic shoe with a portion of the midsole cut away to illustrate a cross-sectional view.

The bladders of the invention are formed from an elastomeric membrane that includes a layer of a microlayer polymeric composite of the present invention. The microlayer polymeric composite of the invention has alternating thin layers of at least one fluid barrier material and at least one structural, elastomeric material. Also contemplated are microlayer polymeric composites that include layers of different fluid barrier materials and/or layers of different elastomeric materials, all of the different layers being arranged in regular repeating order. Other layers in addition to elastomeric layers and fluid barrier layers that alternate along with them in a regular, repeating order may optionally be included. The microlayer polymeric composite should have at least about 10 layers. Preferably, the microlayer polymeric composite has at least about 20 layers, more preferably at least about 30 layers, and still more preferably at least about 50 layers. The microlayer polymeric composite can have thousands of layers, and the skilled artisan will appreciate that the number of layers will depend upon such factors as the particular materials chosen, thicknesses of each layer, the thickness of the microlayer polymeric composite, the processing conditions for preparing the multilayers, and the final application of the composite. The microlayer elastomer membranes preferably has from about 10 to about 1000 layers, more preferably from about 30 to about 1000 and even more preferably it has from about 50 to about 500 layers.

The average thickness of each individual layer of the fluid barrier material may be as low as a few nanometers to as high as several mils (about 100 microns) thick. Preferably, the individual layers have an average thickness of up to about 0.1 mil (about 2.5 microns). Average thicknesses of about 0.0004 mil (about 0.01 micron) to about 0.1 mil (about 2.5 microns) are particularly preferable. For example, the individual barrier material layers can be, on average, about 0.05 mils (about 1.2 microns). The thinner layers of the fluid barrier layer material improves the ductility of the bladder membrane.

Elastomeric materials suitable for forming the structural layers include, without limitation, polyurethane elastomers, including elastomers based on both aromatic and aliphatic isocyanates; flexible polyolefins, including flexible polyethylene and polypropylene homopolymers and copolymers; styrenic thermoplastic elastomers; polyamide elastomers; polyamide-ether elastomers; ester-ether or ester-ester elastomers; flexible ionomers; thermoplastic vulcanizates; flexible poly(vinyl chloride) homopolymers and copolymers; flexible acrylic polymers; and blends and alloys of these, such as poly(vinyl chloride) alloys like poly(vinyl chloride)-polyurethane alloys. The different elastomeric materials may be combined as blends in the structural layers of the microlayer polymeric composite, or may be included as separate layers of the microlayer polymeric composite.

Particularly suitable are thermoplastic polyester-polyurethanes, polyether-polyurethanes, and polycarbonate-polyurethanes, including, without limitation, polyurethanes polymerized using as diol reactants polytetrahydrofurans, polyesters, polycaprolactone polyesters, and polyethers of ethylene oxide, propylene oxide, and copolymers including ethylene oxide and propylene oxide. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is used herein, are compounds having two or more functional groups reactive with isocyanate groups. Preferably the polymeric diol-based polyurethane is substantially linear (i.e., substantially all of the reactants are di-functional).

The polyester diols used in forming the preferred thermoplastic polyurethane of the invention are in general prepared by the condensation polymerization of polyacid compounds and polyol compounds. Preferably, the polyacid compounds and polyol compounds are di-functional, i.e., diacid compounds and diols are used to prepare substantially linear polyester dials, although minor amounts of mono-functional, tri-functional, and higher functionality materials (perhaps up to 5 mole percent) can be included. Suitable dicarboxylic acids include, without limitation, glutaric acid, succinic acid, malonic acid, oxalic acid, phthalic acid, hexahydrophthalic acid, adipic acid, maleic acid and mixtures of these. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, Esterdiol 204 (sold by Eastman Chemical Co.), 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyltin oxides.

The polymeric polyether or polycaprolactone diol reactant used in preparing the preferred thermoplastic polyurethanes reacting a diol initiator, e.g., ethylene or propylene glycol, with a lactone or alkylene oxide chain-extension reagent. Preferred chain-extension reagents are epsilon caprolactone, ethylene oxide, and propylene oxide. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

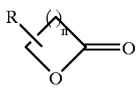

wherein n is a positive integer of 1 to 7 and R is one or more H atoms, or substituted or unsubstituted alkyl groups of 1–7 carbon atoms. Useful catalysts include, those mentioned above for polyester synthesis. Alternatively, the reaction can be initiated by forming a sodium salt of the hydroxyl group on the molecules that will react with the lactone ring.

In another embodiment of the invention, a diol initiator is reacted with an oxirane-containing compound to produce a polyether diol to be used in the polyurethane polymerization. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The alkylene oxide polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition. Homopolymers or copolymers of ethylene oxide or propylene oxide are preferred.

Tetrahydrofuran polymerizes under known conditions to form repeating units

Tetrahydrofuran is polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol, such as the polymeric polyester diols described above, which are used in the polyurethane synthesis preferably have a number average molecular weight (determined for example by the ASTM D-4274 method) of from about 300 to about 4,000; more preferably from about 400 to about 3,000; and still more preferably from about 500 to about 2,000. The polymeric diol generally forms a "soft segment" of the elastomeric polyurethane.

The synthesis of the elastomeric polyurethane may be carried out by reacting one or more of the above polymeric diols, one or more compounds having at least two isocyanate groups, and, optionally, one or more change extension agents. The elastomeric polyurethanes are preferably linear and thus the polyisocyanate component preferably is substantially di-functional. Useful diisocyanate compounds used to prepare the thermoplastic polyurethanes of the invention, include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), the various isomers of toluene diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and combinations thereof. Particularly useful is diphenylmethane diisocyanate (MDI).

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Typical examples of useful diols that are used as polyurethane chain extenders include, without limitation, 1,6-hexanediol, cyclohexanedimethanol (sold as CHDM by Eastman Chemical Co.), 2-ethyl-1,6-hexanediol, Esterdiol 204 (sold by Eastman Chemical Co.), 1,4-butanediol, ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; 1,3-propanediol, 1,4-butanediol, neopentyl glycol, dihydroxyalkylated aromatic compounds such as the bis (2-hydroxyethyl) ethers of hydroquinone and resorcinol; p-xylene-α, α'-diol; the bis (2-hydroxyethyl) ether of p-xylene-α, α'-diol; m-xylene-α,α'-diol and the bis (2-hydroxyethyl) ether and mixtures thereof. Suitable diamine extenders include, without limitation, p-phenylenediamine, m-phenylenediamine, benzidine, 4,4'-methylenedianiline, 4,4'-methylenibis (2-chloroaniline), ethylene diamine, and combinations of these. Other typical chain extenders are amino alcohols such as ethanolamine, propanolamine, butanolamine, and combinations of these. Preferred extenders include ethylene glycol, diethylene glycol, triethylene glycol, tetraethylene glycol, propylene glycol, dipropylene glycol, tripropylene glycol, tetrapropylene glycol, 1,3-propylene glycol, 1,4-butanediol, 1,6-hexanediol, and combinations of these.

In addition to the above-described difunctional extenders, a small amount of trifunctional extenders such as trimethylol propane, 1,2,6-hexanetriol and glycerol, and/or monofunctional active hydrogen compounds such as butanol or dimethyl amine, may also be present. The amount of trifunctional extenders and/or monofunctional compounds employed would preferably be 5.0 equivalent percent or less based on the total weight of the reaction product and active hydrogen containing groups employed.

The reaction of the polyisocyanate, polymeric diol, and chain extension agent is typically conducted by heating the components, for example by melt reaction in a twin screw extruder. Typical catalysts for this reaction include organotin catalysts such as stannous octoate. Generally, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 0.95:1 to 1.10:1, and more preferably, 0.98:1 to 1.04:1. The polymeric diol segments typically are from about 35% to about 65% by weight of the polyurethane polymer, and preferably from about 35% to about 50% by weight of the polyurethane polymer.

It may be desirable under certain applications to include blends of polyurethanes to form the structural layers of the microlayer polymeric composite, such as when susceptibility to hydrolysis is of particular concern. For example, a polyurethane including soft segments of polyether diols or polyester diols formed from the reaction mixture of a carboxylic acid and a diol wherein the repeating units of the reaction product has more than eight carbon atoms can be blended with polyurethanes including polyester diols having repeating units of eight or less carbon atoms or products of branched diols. Preferably, the polyurethanes other than those including polyester diol repeating units having eight or less carbon atoms or with oxygen atoms connected to tertiary carbons will be present in the blends in an amount up to about 30 wt.%, (i.e. 70.0 wt.% polyethylene glycol adipate based polyurethane 30.0% isophthalate polyester diol based polyurethane). Specific examples of the polyester diols wherein the reaction product has more than eight carbon atoms include poly(ethylene glycol isophthalate), poly(1,4-butanediol isophthalate) and poly(1,6-hexanediol isophthalate).

As an alternative to blends of various thermoplastic polyurethanes, a single polyurethane having various soft segments may be used. Again, without intending to be limiting, the soft segments may include, in addition to soft segments having a total of eight carbon atoms or less, polyether diols, polyester diols having a total of more than eight carbon atoms, or mixtures thereof. It is contemplated that the total amount of soft segment constituency which includes the reaction product of a carboxylic acid and a diol having a total carbon atom count of more than eight, be present in an amount of up to about 30 wt.% of the total weight of soft segments included in the polyurethane. Thus, at least 70 wt.% of the soft segment repeating units will be the reaction products of carboxylic acid and a diol, wherein the total carbon atom count for the reaction product is eight or less.

It should also be noted that there are a number of ways to add polyurethanes with up to 30 wt.% of polyesters with repeat units containing more than eight carbon atoms to the polyurethanes of this invention. Thirty percent or less of a polyurethane derived from polyester diols containing repeat units with more than eight carbons can be blended as finished polymers with 70 wt.% or more of polyurethanes derived from polyester diols with repeat units containing eight or less carbon atoms, or a single polyurethane could be prepared from a mixture of polyester diols wherein 70 wt.% or more contain repeat units with eight carbons or less and the balance contains repeat units with more than eight carbons as described previously. A polyurethane could be prepared from a single diol prepared by reaction from dicarboxylic acids and diols such that 70 wt.% of the repeat units in the polyester diol contain eight or less carbon atoms. Combinations of these techniques are also possible. Among the acids that contain more than six carbon atoms that could be employed are isophthalic and phthalic acids.

Among the numerous thermoplastic polyurethanes which are useful in forming the outer layer 32, polyurethanes such as all of which are either ester or ether based, have proven to be particularly useful.

Specific examples of suitable materials include polyamide-ether elastomers marketed under the tradename PEBAX® by Elf Atochem, ester-ether elastomers marketed under the tradename HYTREL® by DuPont, ester-ester and ester-ether elastomers marketed under the tradename ARNITEL® by DSM Engineering, thermoplastic vulcanizates marketed under the tradename SANTOPRENE® by Advanced Elastomeric Systems, elastomeric polyamides marketed under the tradename GRILAMID® by Emser, and elastomeric polyurethanes marketed under the tradename PELLETHANE® by Dow Chemical Company, Midland, Mich., ELASTOLLAN® polyurethanes marketed by BASF Corporation, Mt. Olive, N.J., TEXIN® and DESMOPAN® polyurethanes marketed by Bayer, MORTHANE® polyurethanes marketed by Morton, and ESTANE® polyurethanes marketed by B. F. Goodrich Co.

In addition to the elastomeric materials of the structural layers, the microlayer polymeric composites of the invention include layers of a fluid barrier material. Suitable fluid barrier materials include, without limitation, ethylene vinyl alcohol copolymers, poly(vinyl chloride), polyvinylidene polymers and copolymers such as polyvinylidene chloride in particular, polyamides, including amorphous polyamides; acrylonitrile polymers, including acrylonitrile-methyl acrylate copolymers; polyurethane engineering plastics, polymethylpentene resins; ethylene-carbon monoxide copolymers, liquid crystal polymers, polyethylene terephthalate, polyether imides, polyacrylic imides, and other such polymeric materials known to have relatively low gas transmission rates. Blends and alloys of these materials, such as combinations of polyimides and crystalline polymers such as liquid crystal polymers, polyamides and polyethylene terephthalate, and polyamides with styrenics are also suitable. Ethylene vinyl alcohol copolymers are preferred, particularly those copolymer in which the ethylene copolymer ratio is from about 25 mole percent to about 50 mole percent, and more particularly from about 25 mole percent to about 40 mole percent. Ethylene vinyl alcohol copolymers are prepared by fully hydrolyzing ethylene vinyl acetate copolymers. The different fluid barrier materials may be combined as blends in the structural layers of the microlayer polymeric composite, or may be included as separate layers of the microlayer polymeric composite.

Examples of suitable specific examples include acrylonitrile copolymers such as BAREX®, available from BP Chemicals, Inc.; polyurethane engineering plastics such as ISOPLAST®, available from Dow Chemical Corp., Midland, Mich.; ethylene vinyl alcohol copolymers marketed under the trademarks EVAL® by EVAL Company of America (EVALCA), Lisle, Ill., SOARNOL® by Nippon Goshei Co., Ltd. (U.S.A.) of New York, N.Y., CLARENE® by Solvay, and SELAR® OH by DuPont; polyvinylidiene chloride available from Dow Chemical under the tradename SARAN®, and from Solvay under the tradename IXAN®; liquid crystal polymers such as VECTRA® from Hoechst Celanese and XYDAR® from Amoco Chemicals; MDX®6 nylon, available from Mitsubishi Gas Chemical Co., Ltd, Solvay, and Toyobo and amorphous nylons such as NOVAMID® X21 from Mitsubishi, SELAR® PA from DuPont, and GELON A-100 from General Electric Company; KAMAX® polyacrylic-imide copolymer available from Rohm & Haas; polyetherimides sold under the tradename ULTEM® by General Electric; VINEX poly(vinyl alcohol) available from Air Products; and polymethylpentene resins available from Phillips 66 Company under the tradename CRYSTALOR and from Mitsui Petrochemical Industries under the tradename TPX®v. Highly preferred commercially available copolymers of ethylene and vinyl alcohol, such as those available from EVAL, will typically have an average ethylene content of between about 25 mol% to about 48 mol%.

One further feature of the microlayer polymeric composites of the present invention is the enhanced bonding which can occur between the layers of the elastomeric material and the fluid barrier material. This so-called enhanced bonding is generally accomplished by using materials for both layers that have available functional groups with hydrogen atoms that can participate in hydrogen bonding such as hydrogen atoms in hydroxyl groups or hydrogen atoms attached to nitrogen atoms in polyurethane groups and various receptor groups such as oxygen atoms in hydroxyl groups, carbonyl oxygens in polyurethane groups and ester groups, and chlorine atoms in PVDC, for example. Such microlayer polymeric composites are characterized in that hydrogen bonding is believed to occur between the elastomeric and fluid barrier materials that form the alternating layers. For example, the above described hydrogen bonding is believed to occur when the elastomeric material comprises a polyester diol based polyurethane and the fluid barrier material includes a polymer selected from the group consisting of co-polymers of ethylene and vinyl alcohol, polyvinylidene chloride, co-polymers of acrylonitrile and methyl acrylate, polyethylene terephthalate, aliphatic and aromatic polyamides, crystalline polymers and polyurethane engineering thermoplastics. In addition to the hydrogen bonding, it is theorized that there will also generally be a certain amount of covalent bonding between the layers of the elastomeric first material and the fluid barrier second material if, for example, there are polyurethanes in adjacent layers or if one of the layers includes polyurethane and the adjacent layer includes a barrier material such as copolymers of ethylene and vinyl alcohol. Still other factors such as orientation forces and induction forces, otherwise known as van der Waals forces, which result from London forces existing between any two molecules and dipole-dipole forces which are present between polar molecules are believed to contribute to the bond strength between contiguous layers of thermoplastic polyurethane and the main layer.

In addition to the elastomeric polymer and the barrier polymer, the layers of the microlayer polymeric composite may include various conventional additives including, without limitation, hydrolytic stabilizers, plasticizers, antioxidants, UV stabilizers, thermal stabilizers, light stabilizers, organic anti-block compounds, colorants (including pigments, dyes, and the like), fungicides, antimicrobials (including bacteriocides and the like), mold release agents, processing aids, and combinations of these. Examples of hydrolytic stabilizers include two commercially available carbodiimide based hydrolytic stabilizers known as STABAXOL P and STABAXOL P-100, which are available from Rhein Chemie of Trenton, N.J. Other carbodiimide- or polycarbodiimide-based hydrolytic stabilizers or stabilizers based on epoxidized soy bean oil may be useful. The total amount of hydrolytic stabilizer employed will generally be less than 5.0 wt.% of the composition's total.

Plasticizers can be included for purposes of increasing the flexibility and durability of the final product as well as facilitating the processing of the material from a resinous form to a membrane or sheet. By way of example, and without intending to be limiting, plasticizers such as those based on butyl benzyl phthalate (which is commercially available, e.g. as Santicizer 160 from Monsanto) have proven to be particularly useful. Regardless of the plasticizer or mixture of plasticizers employed, the total amount of plasticizer, if any, will generally be less than 20.0 wt.% of the total composition.

The alternating layers of the structural polymer and the fluid barrier polymer have their major surfaces aligned substantially parallel to the major surfaces of the composite. There are a sufficient number of layers of the fluid barrier polymer so that the microlayer composite has the desired fluid transmission rate.

The multilayer polymeric composites may be formed by at least two different methods. In a first process, the multilayer polymeric composites of the invention can be prepared using a two-layer, three-layer, or five-layer feed block that directs the layered stream into a static mixer or layer multiplier. The static mixer has multiple mixing elements, preferably at least about 5 elements, that increases the number of layers geometrically.

In a second method, the multilayer polymeric composites of the invention can be prepared by providing a first stream comprising discrete layers of polymeric material. A preferred embodiment of this method is described in detail in Schrenk, et al., U.S. Pat. No. 5,094,793, issued Mar. 10, 1992, which is incorporated herein in its entirety by reference. Briefly, the first stream comprising discrete layers can again be formed by directing the molten extrudate from extruders separately containing the elastomeric material and the fluid barrier material into a two-layer, three-layer, or five-layer feed block. The first stream is then divided into a plurality of branch streams, the branch streams are then redirected or repositioned and individually symmetrically expanded and contracted, being finally recombined in an overlapping relationship to form a second stream with a greater number of discrete layers. In addition, protective boundary layers may be incorporated according the method of Ramanathan et al., U.S Pat. No. 5,269,995, issued Dec. 14, 1993, which is incorporated herein in its entirety by reference. The protective layers protect the structural and fluid barrier layers from instability and breakup during the layer formation and multiplication. The protective layers are provided by a steam of molten thermoplastic material which is supplied to the exterior surfaces of the composite stream to form a protective boundary layer at the wall of the coextrusion apparatus. The protective layer may add special optical or physical attributes to the microlayer polymeric composite material, such as special coloration, including metallic coloration obtained by including metallic or other flake pigments in the protective boundary layer.

Although it is not necessary for all of the layers to be complete layers, that is to extend in the plane of that layer to all edges of the piece, it is desirable for most layers to be substantially complete layers, that is to extend to the edges of the membrane.

The elastomeric membrane of the invention includes the microlayer polymeric composite, either as an only layer or as one layer in a laminate construction. The membrane may be of any convenient length and width for forming the desired footwear bladder or hydraulic accumulator. The average thickness of the microlayer polymeric composite of the membrane may vary widely, but it may be, for example, from about 3 mils (about 75 microns) to about 200 mils (about 0.5 cm). Preferably, the average thickness of the microlayer polymeric composite is at least about 50 microns, preferably from about 75 microns to about 0.5 cm, more preferably from about 125 microns to about 0.5 cm, and particularly preferably from about 125 microns to about 0.15 cm. When the microlayer polymeric composite is to be used to prepare a bladder for footwear it is preferred that the microlayer material have an average thickness of from about 3 mils (about 75 microns) to about 40 mils (about 0.1 cm), while membranes used in hydropneumatic accumulators are usually thicker. In one preferred embodiment the microlayer polymeric composite has an average thickness of at least about 125 microns.

The membrane of the invention can be a laminate that includes the microlayer polymeric material as one or more laminate layers. Preferably, the alternate layers are selected from the polymers listed above as suitable as the structural material of the microlayer material, and more preferably the alternate layers are polyurethane materials. Any number of microlayer layers, preferably from one to about 5, more preferably one to three are used as alternate layers of the laminate. The other layers of the laminate preferably as elastomeric and include thermoplastic elastomers selected from those already mentioned as suitable for the structural layers of the microlayer polymeric composite. One preferred membrane of the invention is a laminate that includes at least one layer A of an elastomeric polyurethane and at least one layer B of the microlayer polymeric composite. In other preferred embodiment, the membrane is a laminate having layers A-B-A or layers A-B-A-B-A.

When the microlayer polymeric film is used to prepare a laminate, the laminate may have an average thickness of from about 3 mils (about 75 microns) to about 200 mils (about 0.5 cm), and preferably it has an average thickness of from about 3 mils (about 75 microns) to about 50 mils (about 0.13 cm). The microlayer polymeric film layer of the laminate is preferably from about 0.25 mil (about 6.35 microns) to about 102 mils (2600 microns).

A bladder may be produced by RF (radio frequency) welding two sheets of the microlayer material or microlayer-containing laminate, particularly when one layer is a polar material such as a polyurethane. Nonpolar materials such as polyolefins can be welded using ultrasound or heat sealing techniques. Other well-known welding techniques may also be employed.

When used as cushioning devices in footwear such as shoes, the bladder may be inflated, preferably with nitrogen, to an internal pressure of at least about 3 psi and up to about 50 psi. Preferably the bladder is inflated to an internal pressure of from about 5 psi to about 35 psi, more preferably from about 5 psi to about 30 psi, still more preferably from about 10 psi to about 30 psi, and yet more preferably from about 15 psi to about 25 psi. It will be appreciated by the skilled artisan that in applications other than footwear applications the desired and preferred pressure ranges may vary dramatically and can be determined by those skilled in that particular field of application. Accumulator pressures, for example, can range up to perhaps 1000 psi.

Preferably, the membranes described herein may be useful for forming cushioning components for footwear. In such applications, the membranes preferably are capable of containing a captive gas for a relatively long period of time. In a highly preferred embodiment, for example, the membrane should not lose more than about 20% of the initial inflated gas pressure over a period of approximately two years. In other words, products inflated initially to a steady state pressure of between 20.0 to 22.0 psi should retain pressure in the range of about 16.0 to 18.0 psi for at least about two years.

The inflationary gas transmission rate of the material for the inflationary gas, which is preferably nitrogen gas, should be less than 10 cubic centimeters per square meter per atmosphere per day ($cc/m^2 \cdot atm \cdot day$), preferably less than about 3 $cc/m^2 \cdot atm \cdot day$, and particularly preferably less than about 2 $cc/m^2 \cdot atm \cdot day$.

The microlayer polymeric composites provide increased resistance to delamination and cracking. Dividing the barrier layer into numerous layers increases the resistance of individual layers to cracking. While not wishing to be bound by theory, it is believed that, given the same external dimensions and a constant density of flaws, a laminate with thinner layers will likely contain fewer flaws in each layer. Thus, the microlayer polymeric composites containing the same amount of barrier material overall as a traditional laminate, but having the barrier material divided between many more layers than the one layer or few layers in the traditional laminate, will contain more barrier material in uncracked layers than would the traditional laminate if a crack should develop from each flaw as the material is loaded. In addition, if a barrier layer in a microlayer composite develops a crack, dissipative processes along the interfaces help to confine the crack to one layer. Fluid transmission rate should not be affected significantly if cracks develop within some of the barrier layers because adjacent barrier layers still force the diffusing species to take a circuitous path in order to permeate the membrane.

Among these techniques known in the art are extrusion, blow molding, injection molding, vacuum molding, transfer molding, pressure forming, heat-sealing, casting, melt casting, and RF welding, among others.

Figure 2:
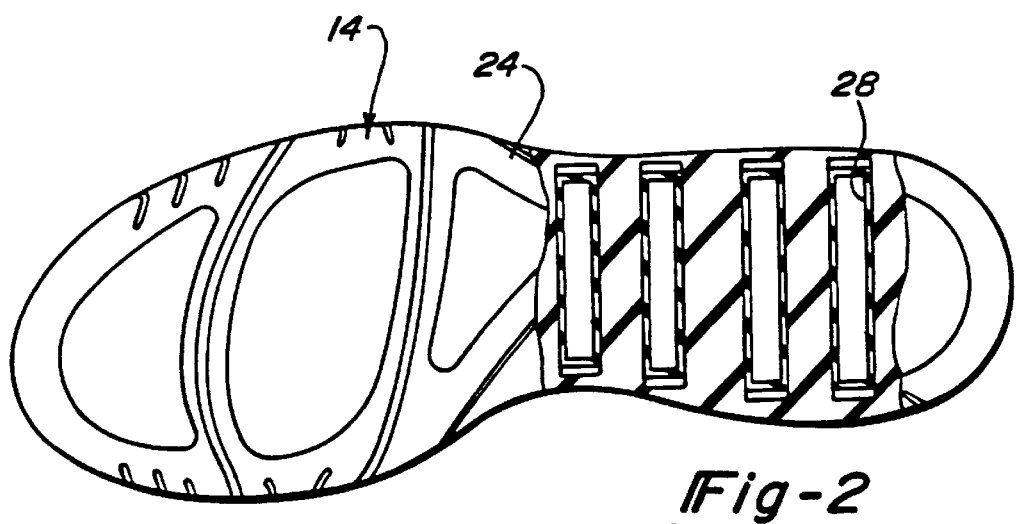
FIG. 2 is a bottom elevational view of the athletic shoe of FIG. 1 with a portion cut away to expose another cross-sectional view.
Figure 3:
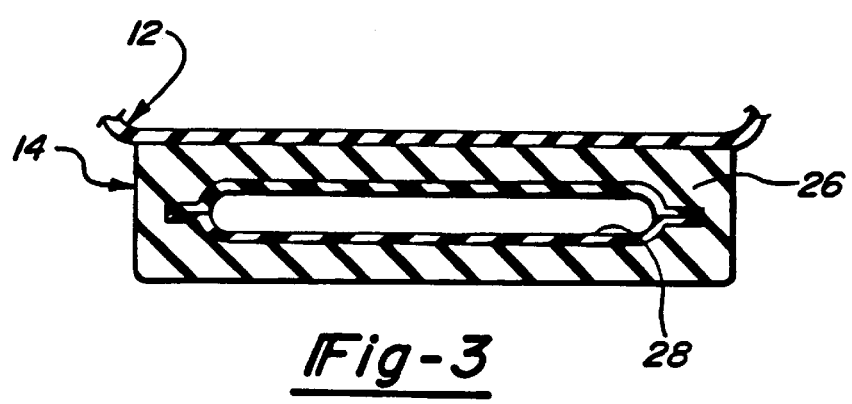
FIG. 3 is a section view taken alone line 3—3 of FIG. 1.

Referring to FIGS. 1–3, there is shown an athletic shoe, including a sole structure and a cushioning device as one example of a product formed from a membrane in accordance with the teachings of the present invention. The shoe 10 includes a shoe upper 12 to which the sole 14 is attached. The shoe upper 12 can be formed from a variety of conventional materials including, but not limited to, leathers, vinyls, and nylons and other generally woven fibrous materials. Typically, the shoe upper 12 includes reinforcements located around the toe 16, the lacing eyelets 18, the top of the shoe 20 and along the heel area 22. As with most athletic shoes, the sole 14 extends generally the entire length of the shoe 10 from the toe region 20 through the arch region 24 and back to the heel portion 22.

Figure 4:
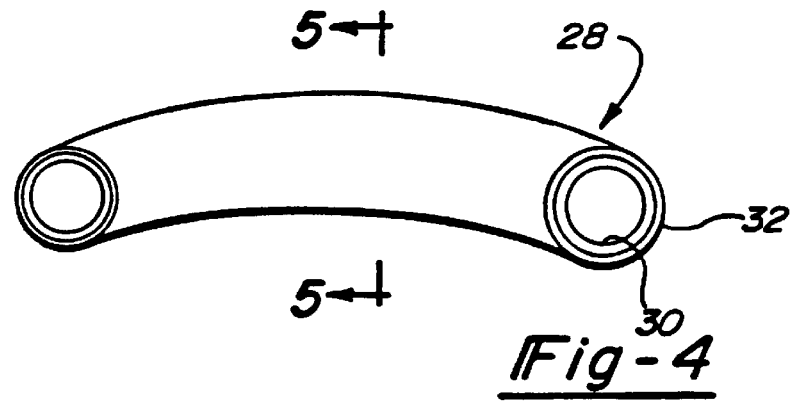
FIG. 4 is a fragmentary side perspective view of one embodiment of a tubular-shaped, two-layer cushioning device.
Figure 5:
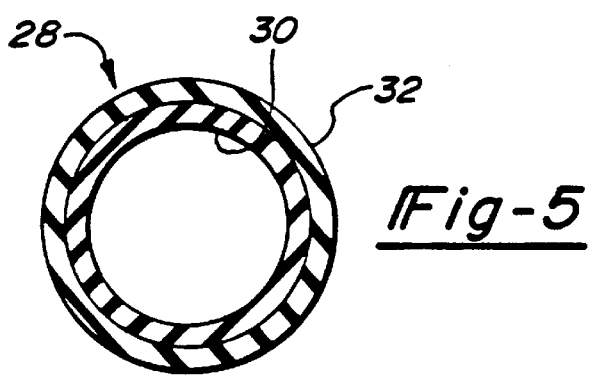
FIG. 5 is a sectional view taken along line 4—4 of FIG. 4.
Figure 24:
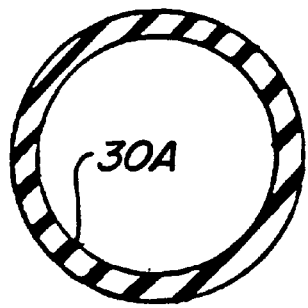
FIG. 24 is a sectional view of a monolayer tubular membrane.

The sole structure 14 is shown to include one or more cushioning devices or bladders 28 according to the invention, which are generally disposed in the midsole of the sole structure. By way of example, the membranes 28 of the present invention can be formed into products having various geometries such as a plurality of tubular members which are positioned in a spaced apart, parallel relationship to each other within the heel region 22 of the midsole 26 as illustrated in FIGS. 1–3. The tubular members are sealed to contain an injected captive gas. The barrier properties of the membrane 28 may be provided by a single layer of the microlayer polymeric composite 30A as shown in FIG. 24 or by the microlayer polymeric composite layer 30 as shown in FIGS. 4–5 which is disposed along the inner surface of a thermoplastic elastomer outer layer 32. As illustrated in FIGS. 8–18, the membranes 28 of the present invention, whether monolayer or multi-layer embodiments, can be formed into a variety of products having numerous configurations or shapes. As should be appreciated at this point, membranes 28 which are formed into cushioning devices employed in footwear may either be fully or partially encapsulated within the midsole or outsole of the footwear. The bladder is thus incorporated as a portion of the sole and may form at least a part of an outer surface of the shoe at the sole.

Referring again to FIGS. 1–3, a membrane 28 in accordance with teachings of the present invention is illustrated as being in the form of a cushioning device such as those useful as components of footwear. The membrane 28, according to the embodiment illustrated in FIG. 24, comprises a single layer 30A of a microlayer polymeric composite of an elastomeric material, preferably a material comprising one or more polyester diol-based polyurethanes and a second material comprising one or more fluid barrier polymers.

Figure 6:
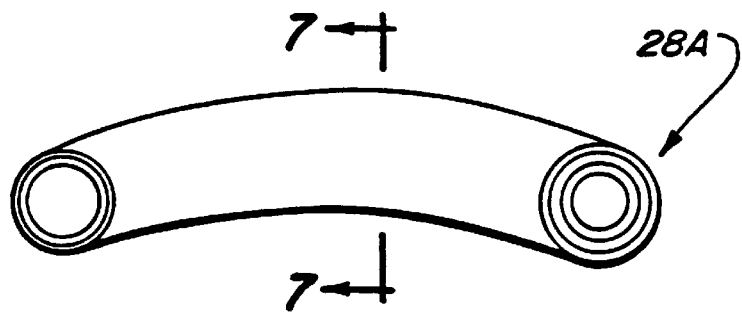
FIG. 6 is a fragmentary side perspective view of a second embodiment of a tubular-shaped, three-layer cushioning device.
Figure 7:
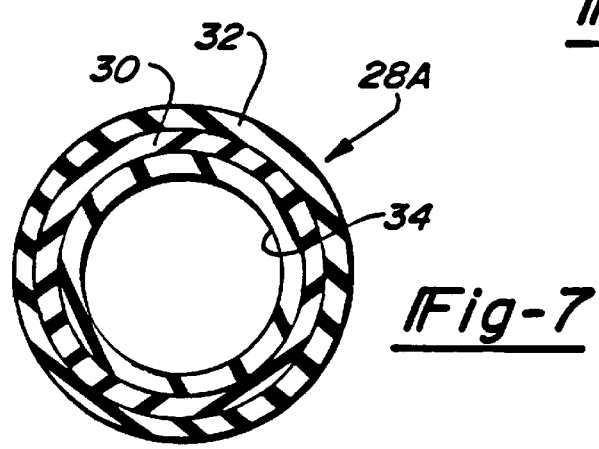
FIG. 7 is a sectional side view taken along line 6—6 of FIG. 6.

Referring now to FIGS. 6 and 7, an alternative membrane embodiment A in the form of an elongated tubular shaped multi-layered component is illustrated. The modified membrane A is essentially the same as the membrane 28 illustrated in FIGS. 4 and 5 except that a third layer 34 is provided contiguously along the inner surface of the layer 30, such that layer 30 is sandwiched between an outer layer 32 and an innermost layer 34. The innermost layer 34 is also preferably made from a thermoplastic polyurethane material. In addition to the perceived benefit of enhanced protection against degradation of layer 30, layer 34 also tends to assist in providing for high quality welds which facilitate the formation of three-dimensional shapes for products such as cushioning devices useful in footwear.

Membranes such as those shown in FIGS. 1–7 and FIG. 24 are preferably fabricated from extruded tubes. Lengths of the tubing are continuously extruded and typically spooled in about fifty feet lengths when manufactured for inflatable bladders for footwear. Sections of the tubing are RF welded or heat sealed to the desired lengths. The individual sealed inflatable bladders produced upon RF welding or heat sealing are then separated by cutting through the welded areas between adjacent bladders. The bladders can then be inflated to a desired initial inflation pressure ranging from 3 psi ambient to 100 psi, preferably in the range of 3 to 50 psi, with the captive gas preferably being nitrogen. It should also be noted that the bladders can be fabricated from so-called flat extruded tubing as is known in the art with the internal geometry being welded into the tube.

Figure 8:
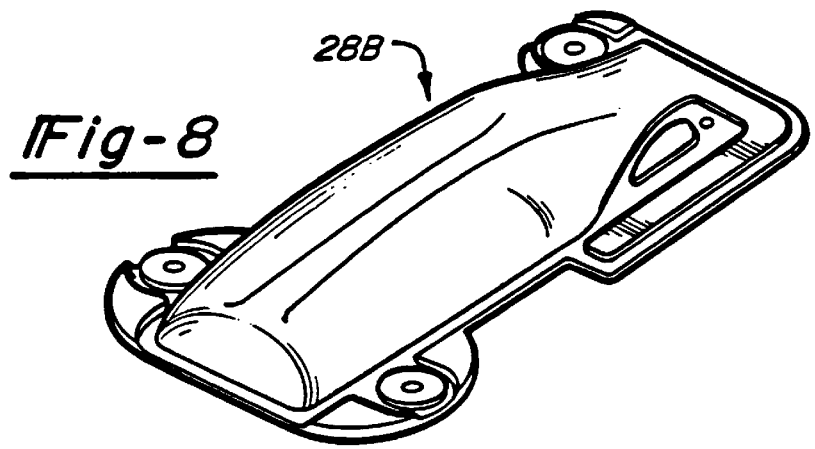
FIG. 8 is a perspective view of a membrane embodiment according to the present invention formed into a shoe cushioning device.
Figure 9:
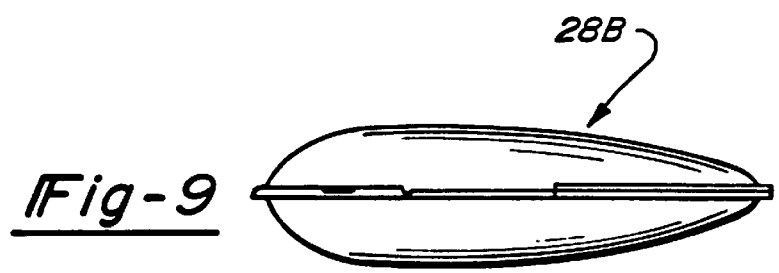
FIG. 9 is a side view of the membrane illustrated in FIG. 8.
Figure 10:
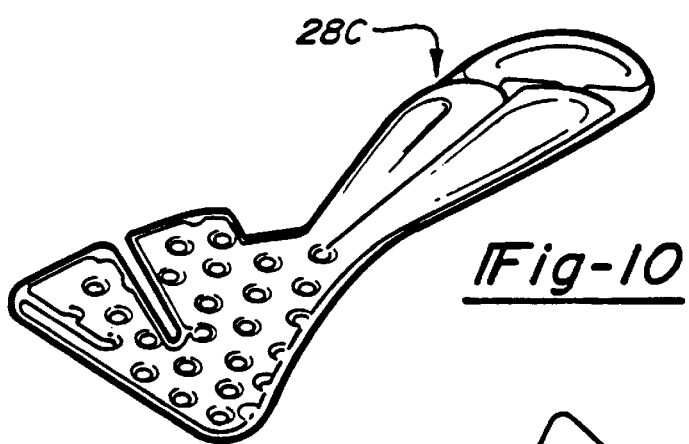
FIG. 10 is a perspective view of a membrane embodiment according to the present invention formed into a shoe cushioning device.
Figure 11:
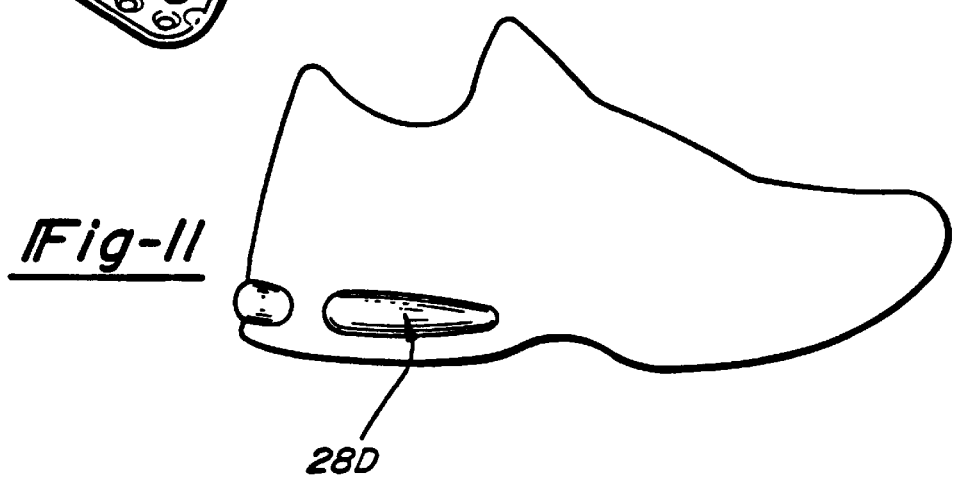
FIG. 11 is a side elevational view of a membrane embodiment according to the present invention formed into a cushioning device which is incorporated into a shoe.

Other embodiments formed from the membranes described herein are shown in FIGS. 8–10. Sheets or films of extruded monolayer film or co-extruded two layer or three layer film are formed to the desired thicknesses. For example, the thickness range of the co-extruded sheets or films is preferably between 0.5 mils to 10 mils for the layer 30 and between 4.5 mils to about 100 mils for the layers 32 and 34, respectively. For monolayer cushioning device embodiments, the average thickness will generally be between 5 mils to about 60 mils and, more preferably, between about 15 mils and to about 40 mils.

Figure 12:
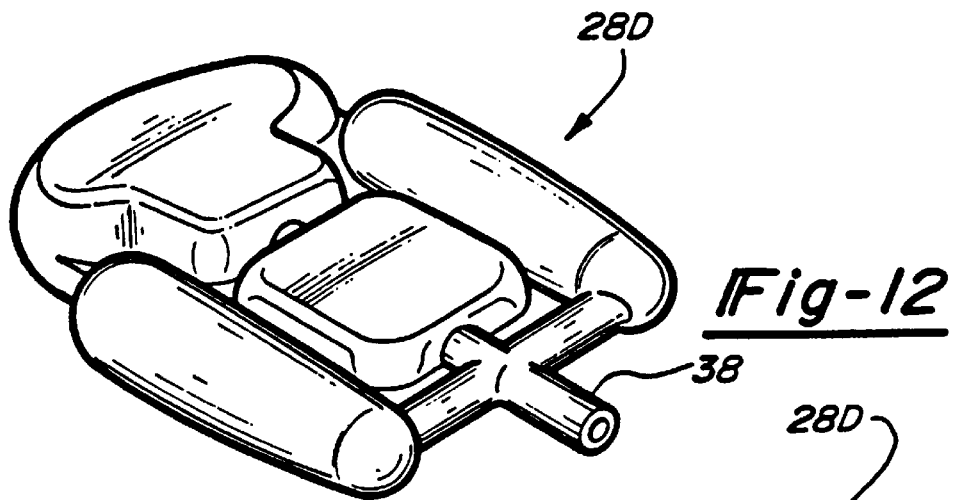
FIG. 12 is a perspective view of the membrane illustrated in FIG. 11.
Figure 13:
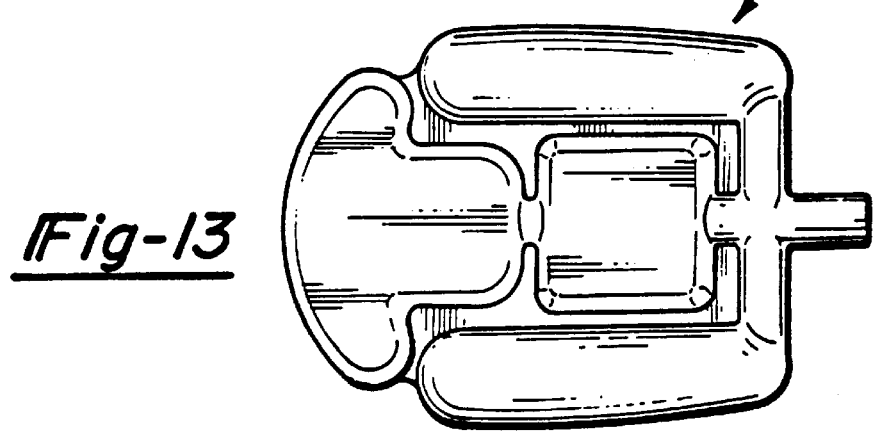
FIG. 13 is a top elevation view of the membrane illustrated in FIGS. 11 and 12.
Figure 14:
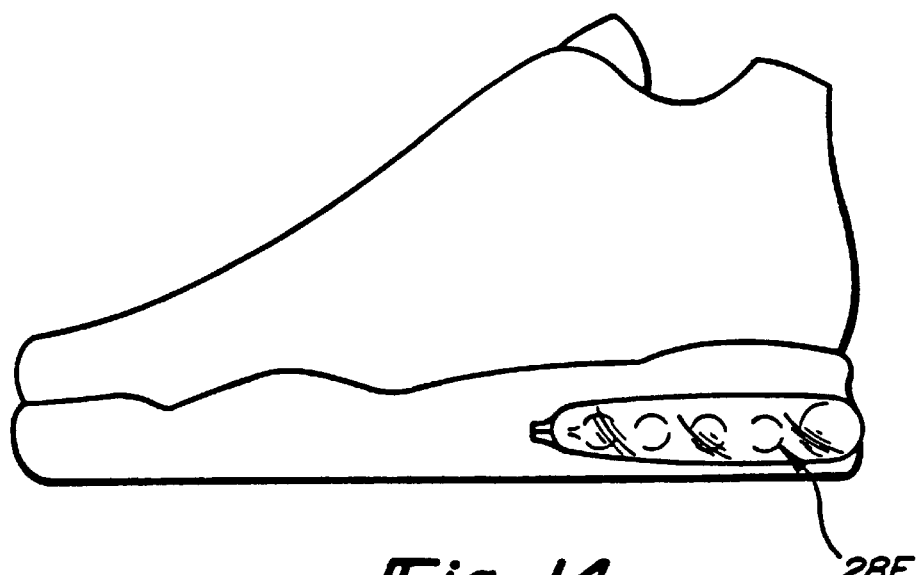
FIG. 14 is a side elevation view of a membrane embodiment according to the present invention formed into a cushioning device incorporated into a shoe.
Figure 15:
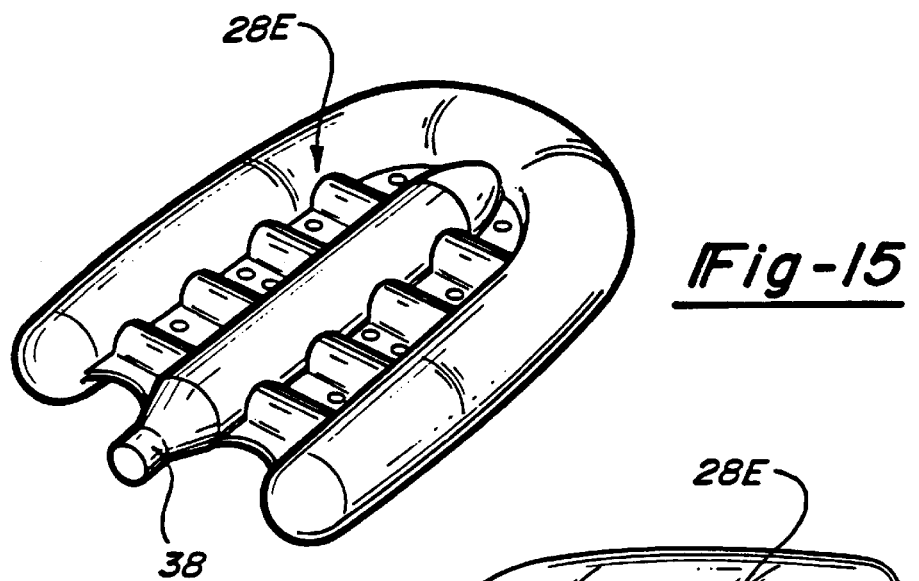
FIG. 15 is a perspective view of the membrane illustrated in FIG. 14.
Figure 16:
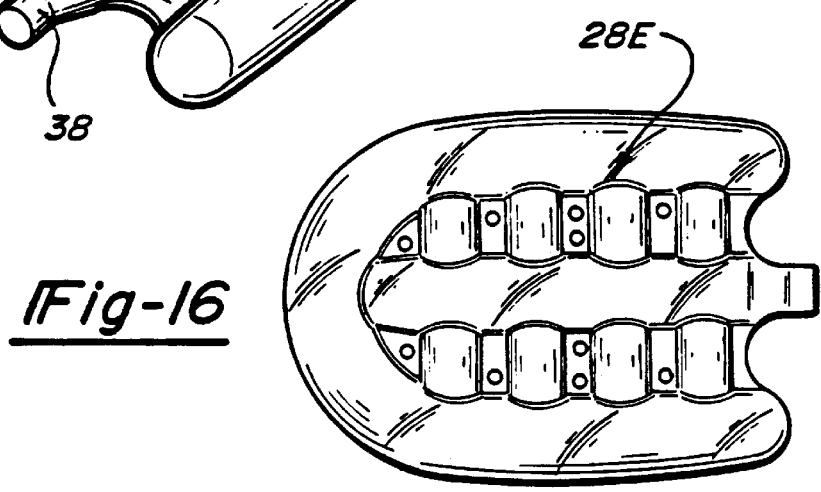
FIG. 16 is a top view of the membrane illustrated in FIGS. 14 and 15.

Referring to FIGS. 12–16, membranes fabricated into inflatable bladders by blow molding are shown. To form the bladders, single layer parisons of the microlayer polymeric composite are extruded or parisons of two layer or three layer films, one layer being the microlayer polymeric composite, are co-extruded as illustrated in FIGS. 21–23. Thereafter, the parisons are blown and formed using conventional blow molding techniques. The resulting bladders, examples of which are shown in FIGS. 12 and 15, are then inflated with the desired captive gas to the preferred initial inflation pressure and then the inflation port (e.g. inflation port 38) is sealed by RF welding.

Figure 17:
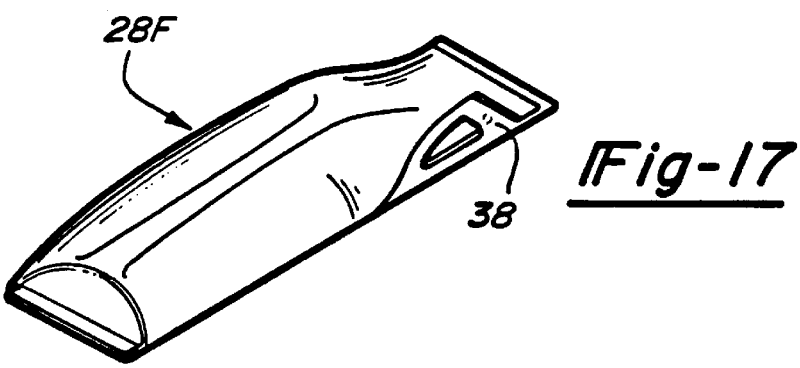
FIG. 17 is a perspective view of a membrane embodiment according to the teachings of the present invention formed into a shoe cushioning device.
Figure 18:
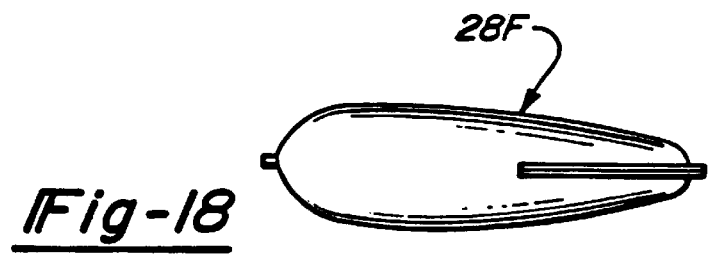
FIG. 18 is a side view of the membrane illustrated in FIG. 17.

Still another embodiment formed from a membrane of the present invention is shown in FIGS. 17 and 18. The air bladder is fabricated by forming extruded single layer or co-extruded multiple layer tubing having a desired thickness range. The tubing is collapsed to a lay flat configuration and the opposite walls are welded together at selected points and at each end using conventional heat sealing or RF welding techniques. The cushioning device is then inflated through a formed inflation port 38 to the desired inflation pressure which ranges from 5 psi ambient to 100 psi, and preferably from 5 to 50 psi, with a captive gas such as nitrogen.

Figure 25:
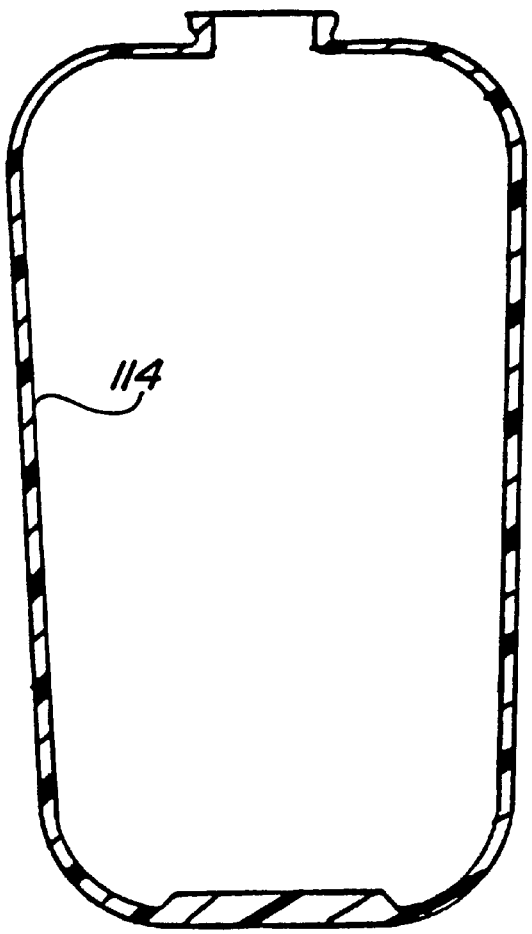
FIG. 25 is a sectional view of a product formed from a monolayer membrane according to the teachings of the present invention.

In addition to employing the membranes of the present invention as cushioning devices or air bladders as described above, still another highly desirable application for the membranes of the present invention is for accumulators as illustrated in FIGS. 19, 20 and 25.

Referring to FIG. 25, there is shown an accumulator embodiment formed from a monolayer membrane as described above. Likewise, referring to FIGS. 19 and 20, there are shown two alternative accumulator embodiments formed from a multi-layer membrane of the present invention. Accumulators, and more particularly, hydraulic accumulators are used for vehicle suspension systems, vehicle brake systems, industrial hydraulic accumulators or for other applications having differential pressures between two potentially dissimilar fluid media. The membrane 124 separates the hydraulic accumulator into two chambers or compartments, one of which contains a gas such as nitrogen and the other one of which contains a liquid. Membrane 124 includes an annular collar 126 and a flexible body portion 128. Annular collar 126 is adapted to be secured circumferentially to the interior surface of the spherical accumulator such that body portion 128 divides the accumulator into two separate chambers. The flexible body portion 128 moves generally diametrically within the spherical accumulator and its position at any given time is dependent upon the pressure of the gas on one side in conjunction with the pressure of the liquid on the opposite side.

By way of further example, FIG. 20 illustrates a product in the form of a hydraulic accumulator including a first layer 114 of the microlayer polymeric composite of the invention. Additionally, the product includes layers 112 and 116 formed from one or more thermoplastic elastomers. As shown, the first layer 114 only extends along a segment of the entire accumulator body portion. It may be desirable to utilize such embodiments, otherwise referred to herein as "intermittent constructions" under circumstances where the delamination potential along certain segments of a product is greatest. One such location is along the annular collar 126 of the bladder or diaphragm for hydraulic accumulators in laminate embodiments. Thus, while the laminate membranes of the present invention are generally more resistant to delamination and do a better job of preventing gas from escaping along interfaces between layers such as those occurring along the annular collar via capillary action, it should be recognized that the membranes 110 described herein can include segments which do not include layer 114.

The membranes as disclosed herein can be formed by various processing techniques including but not limited to extrusion, profile extrusion, injection molding, and blow molding and may be sealed to form an inflatable bladder by heat sealing or RF welding of the tubing and sheet extruded film materials. Preferably, the materials are combined at a temperature of between about 300° F. to about 465° F. and a pressure of at least about 200 psi to obtain optimal wetting for maximum adhesion between the contiguous portions of the layers 30, 32 and 34 respectively and further to enhance hydrogen bonding between the layers wherein the materials employed are conducive to hydrogen bonding. Multi-layer laminate membranes are made from films formed by co-extruding the microlayer polymeric composite material forming layer 30 together with the elastomeric material comprising layer 32. After forming the multi-layered laminate film materials, the film materials are heat sealed or welded by RF welding to form the resilient, inflatable bladders.

Similarly, the membranes 110 which are subsequently formed into the products illustrated in FIGS. 19, 20 and 25, may be co-extrusions give rise to products which appear to demonstrate the above desired hydrogen bonding between the respective layers 114 and, 112 and 116. To form a product such as a hydraulic accumulator bladder or diaphragm via a multi-layer process, such as blow molding, any one of a number of commercially available blow molding machines such as a Bekum BM502 utilizing a co-extrusion head model No. BKB95-3B1 (not shown) or a Krup KEB-5 model utilizing a model No. VW60/35 co-extrusion head (not shown) could be utilized.

The membranes, whether in the form of sheet, substantially closed containers, cushioning devices, accumulators or other structures, preferably will have a tensile strength on the order of at least about 2500 psi; a 100% tensile modulus of between about 350–3000 psi and/or an elongation of at least about 250% to about 700%.

Sheet can be made by forcing molten polymer formed in the extruder through a coat hanger die. Collapsed tubing and parisons used in blow molding are made by forcing molten plastic generated by an extruder through an annular die.

The microlayer polymeric composite can be used as one layer of a multilayer laminate. A multi-layer process known as sheet co-extrusion is also a useful technique to form membranes in accordance with the teachings of the present invention. Sheet co-extrusion generally involves the simultaneous extrusion of two or more polymeric materials through a single die where the materials are joined together such that they form distinct, well bonded layers forming a single extruded product.

The equipment required to produce co-extruded sheet consists of one extruder for each type of resin which are connected to a co-extrusion feed block such as that shown in FIGS. 21 and 23, which are commercially available from a number of different sources including the Cloeren Company of Orange, Tex. and Production Components, Inc. of Eau Claire, Wis., among others.

The co-extrusion feed block 150 consists of three sections. The first section 152 is the feed port section which connects to the individual extruders and ports the individual round streams of resin to the programming section 154. The programming section 154 then reforms each stream of resin into a rectangular shape the size of which is in proportion to the individual desired layer thickness. The transition section 156 combines the separate individual rectangular layers into one square port. The melt temperature of each of the TPU layers should generally be between about 300° F. to about 465° F. To optimize adhesion between the respective layers, the actual temperature of each melt stream should be set such that the viscosities of each melt stream closely match. The combined laminar melt streams are then formed into a single rectangular extruded melt in the sheet die 158 which preferably has a "coat hanger" design as shown in FIG. 22 which is now commonly used in the plastics forming industry. Thereafter the extrudate can be cooled utilizing rollers 160 forming a rigid sheet by either the casting or calendering process.

Similar to sheet extrusion, the equipment required to produce co-extruded tubing consists of one extruder for each type of resin with each extruder being connected to a common multi-manifolded tubing die. The melt from each extruder enters a die manifold such as the one illustrated in FIG. 23 which is commercially available from a number of different sources including Canterberry Engineering, Inc. of Atlanta, Ga. and Genca Corporation of Clearwater, Fla. among others, and flows in separate circular flow channels 172A and 172B for the different melts. The flow channels are then shaped into a circular annulus the size of which is proportional to the desired thickness for each layer. The individual melts are then combined to form one common melt stream just prior to the die entrance 174. The melt then flows through a channel 176 formed by the annulus between the outer surface 178 of a cylindrical mandrel 180 and the inner surface 182 of a cylindrical die shell 184. The tubular shaped extrudate exits the die shell and then can be cooled into the shape of a tube by many conventional pipe or tubing calibration methods. While a two component tube has been shown in FIG. 23 it should be understood by those skilled in the art that additional layers can be added through separate flow channels.

Regardless of the plastic forming process used, it is desirable that a consistent melt of the materials employed be obtained to accomplish bonding between layers across the intended length or segment of the laminated product. Again then, the multi-layer processes utilized should be carried out at maintained temperatures of from about 300° F. to about 465° F. Furthermore, it is important to maintain sufficient pressure of at least 200 psi at the point where the layers are joined wherein the above described hydrogen bonding is to be effectuated.

As previously noted, in addition to the excellent bonding which can be achieved for the laminated membrane embodiments of the present invention, another objective, especially with regard to membranes employed as cushioning devices for footwear, is to provide membranes which are capable of retaining captive gases for extended periods of time. In general, membranes which offer gas transmission rate values of 15.0 or less for nitrogen gas as measured according to the procedures designated at ASTM D-1434-82 are acceptable candidates for extended life applications. Thus, while the membranes of the present invention can have varying thicknesses depending mainly on the intended use of the final product, the membranes of the present invention will preferably have a gas transmission rate value of 15.0 or less, regardless of the thickness of the membrane. Likewise, while nitrogen gas is the preferred captive gas for many embodiments and serves as a benchmark for analyzing gas transmission rates in accordance with ASTM D-1434-82, the membranes can contain a variety of different gases and/or liquids.

In preferred embodiments, the membranes of the present invention will have a gas transmission rate of 10.0 and still, more preferably, will have gas transmission rates of 7.5 or less for nitrogen gas. Still more preferably, the membranes of the present invention will have a gas transmission rate of 5.0 or less and, still more preferably yet, will have a gas transmission rate of 2.5 or less for nitrogen gas. Under the most highly preferred embodiments, the membranes of the present invention will have a gas transmission rate of 2.0 or less for nitrogen gas.

In addition to the improved resistance to gas transmission offered by the various products formed from the polyester diol based polyurethanes described herein, products made from polyester diol based polyurethanes have also shown a marked improvement in durability over thermoplastic polyurethanes which do not include polyester polyols.

Upon inflating the cushioning devices to 20.0 psig with nitrogen gas, each sample was intermittently compressed by a reciprocating piston having a 4.0 inch diameter platen. The stroke of each piston was calibrated to travel a height which would compress each sample to an average of 25.0% of the initial inflated height at maximum stroke. The reciprocating pistons were then allowed to cycle or stroke until a part failure was detected. Part failure, as the term is used herein, is defined as a sufficient leakage of the nitrogen gas and deflation of the cushioning device to cause a lever placed in identical locations along each of the cushioning devices to contact a microswitch which stops the reciprocating piston stroke. The total number of cycles or strokes were then recorded for each sample with a high number of strokes being indicative of a more durable material. Preferably, permanently inflated cushioning devices should be capable of withstanding at least about 200,000 cycles to be considered for applications as footwear components. In addition to a high degree of durability, it is often desirable to form products which are relatively transparent in nature, i.e. products which meet certain standards in terms of the yellowness level detected and the transmission of light through the material. For example, transparency of the product is often a consideration for cushioning devices such as those utilized as components of footwear wherein the cushioning device is visually accessible. Cushioning devices formed from Pellethane 2355-85 ATP or Pellethane 2355-

87AE have proven to be useful for shoe components since the material has been shown to offer acceptable levels both in terms of the yellowness level detected and the light transmission through the material.

While the bladders of the invention have been described for the highly useful applications of cushioning devices for footwear and for accumulators, it should be appreciated that the membranes of the present invention have a broad range of applications, including but not limited to bladders for inflatable objects such as footballs, basketballs, soccer balls, inner tubes; flexible floatation devices such as tubes or rafts; as a component of medical equipment such as catheter balloons; as part of an article of furniture such as chairs and seats, as part of a bicycle or saddle, as part of protective equipment including shin guards and helmets; as a supporting element for articles of furniture and, more particularly, lumbar supports; as part of a prosthetic or orthopedic device; as a portion of a vehicle tire, particularly the outer layer of the tire; and as part of certain recreation equipment such as components of wheels for in-line or roller skates.

Procedure

A microlayer laminate was prepared by the following method. Two extruders, one for polyurethane elastomer and one for ethylene vinyl alcohol copolymer, were connected to a feed block. The molten polymer from the extruders fed into the feed block, producing either a three-layer polyurethane/EVOH/polyurethane stream or a five-layer polyurethane/EVOH/polyurethane/EVOH/polyurethane stream. The stream from the feedblock is fed continuously into a static mixer to produce a stream with microlayers of polyurethane and EVOH. The microlayer stream was fed into a sheet die and then onto a three-roll stack. The laminate was cooled and then slit and wound in line.

EXAMPLE 1

Figure 26:
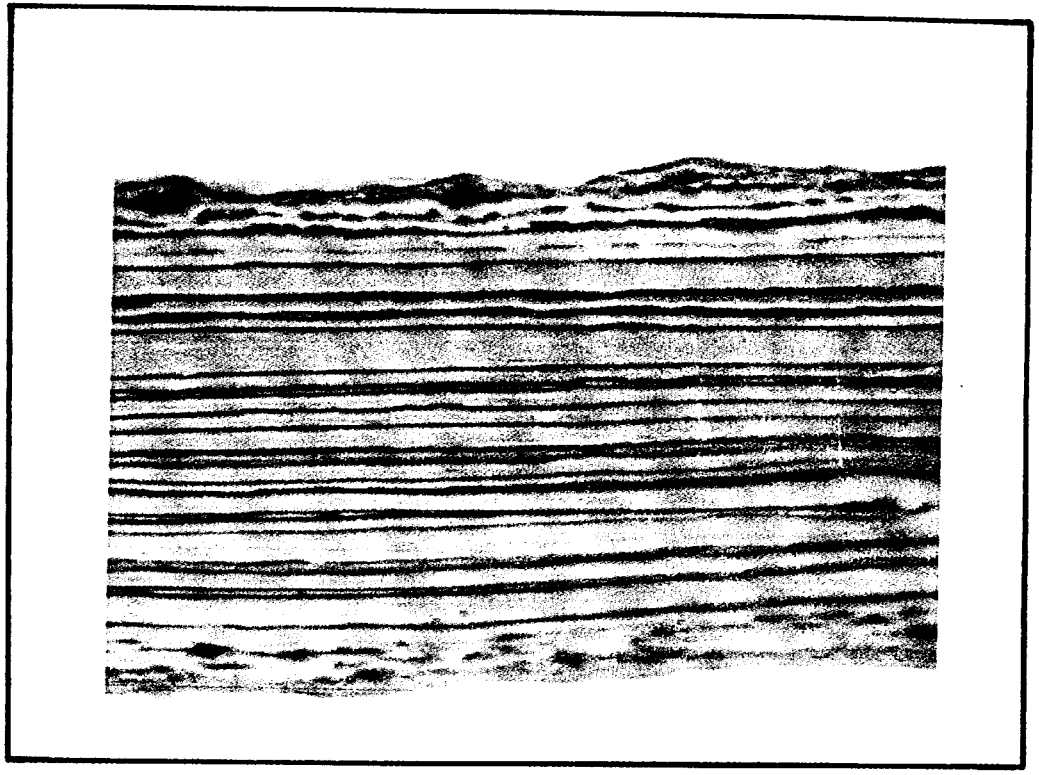
FIG. 26 is a photograph of a cross-section of a microlayer polymeric composite according to the invention.

In the above procedure, Pellethane 2355 85ATP (a polyester-polyurethane copolymer having a Shore A hardness of 85, available from Dow Chemical Co., Midland, Mich.) was used as the polyurethane and LCF 101A (an ethylene-vinyl alcohol copolymer having 32% that is available from Eval, Chicago, Ill.) was used as the EVOH were fed into a five-stream feedblock. The stream from the feedblock was introduced into a static mixer having seven elements. The resulting microlayer polymeric composite had 15% by weight of the LCF 101A and had a thickness of 20 mils. FIG. 26 is a photograph of a cross-section of the microlayer polymeric composite produced, taken using an optical microscope in reflectance mode. The EVOH layers were stained using an iodine solution. The photograph shows at least 28 layers of material.

The physical properties of the microlayer polymeric composite were measured.

| | |
|---|---|
| Tensile strength | 6494 psi |
| Elongation at fail | 490% |
| Tensile modulus | 44,200 psi |
| 50% modulus | 1860 psi |
| 100% modulus | 2016 psi |
| 200% modulus | 2586 psi |
| 300% modulus | 3741 psi |

EXAMPLE 2

A microlayer polymeric composite was produced according to Example 1, but having 7.5% by weight of the LCF 101A. The physical properties of the microlayer polymeric composite were measured.

| | |
|---|---|
| Tensile strength | 7569 psi |
| Elongation at fail | 545% |
| Tensile modulus | 28,175 psi |
| 50% modulus | 1562 psi |
| 100% modulus | 1777 psi |
| 200% modulus | 2419 psi |
| 100% modulus | 3636 psi |
| Gas Transmission Rate (for nitrogen) | 0 |

What is claimed is:

1. A pressurized bladder, comprising an elastomeric barrier membrane enclosing an inflationary gas, wherein:
    said membrane comprises a microlayer polymeric composite having an average thickness of at least about 50 microns, wherein said microlayer polymeric composite includes at least about 10 microlayers, each microlayer individually up to about 100 microns thick, said microlayers alternating between at least one gas barrier material and at least one elastomeric material; and further wherein said membrane has a gas transmission rate toward the inflationary gas of about 10 $cc/m^2 \cdot atm \cdot day$ or less.

2. A bladder according to claim 1, wherein said elastomeric material includes a member selected from the group consisting of polyurethane elastomers, flexible polyolefins, styrenic thermoplastic elastomers, polyamide elastomers, polyamide-ether elastomers, ester-ether elastomers, ester-ester elastomer, flexible ionomers, thermoplastic vulcanizates, flexible poly(vinyl chloride) homopolymers and copolymers, flexible acrylic polymers, and combinations thereof.

3. A bladder according to claim 1, wherein said elastomeric material includes a polyurethane elastomer.

4. A bladder according to claim 1, wherein said elastomeric material includes a member of the group consisting of thermoplastic polyester diol-based polyurethanes, thermoplastic polyether diol-based polyurethanes, thermoplastic polycaprolactone diol-based polyurethanes, thermoplastic polytetrahydrofuran diol-based polyurethanes, thermoplastic polycarbonate diol-based polyurethanes, and combinations thereof.

5. A bladder according to claim 4, wherein the elastomeric material includes a thermoplastic polyester diol-based polyurethane.

6. A bladder according to claim 5, wherein the polyester diol of said polyurethane is a reaction product of at least one dicarboxylic acid and at least one diol.

7. A bladder according to claim 6, wherein the dicarboxylic acid is selected from the group consisting of adipic acid, glutaric acid, succinic acid, malonic acid, oxalic acid, and mixtures thereof.

8. A bladder according to claim 6, wherein the diol is selected from the group consisting of ethylene glycol, diethylene glycol, triethylene glycol, tetraethylene glycol, propylene glycol, dipropylene glycol, tripropylene glycol, tetrapropylene glycol, 1,3-propanediol, 1,4-butanediol, neopentyl glycol, 1,5-pentanediol, 1,6-hexanediol, and mixtures thereof.

9. A bladder according to claim 6, wherein the carboxylic acid includes adipic acid and the diol includes 1,4-butanediol.

10. A bladder according to claim 5, wherein the polyurethane is polymerized using at least one extender compound selected from the group consisting of diols and diamines.

11. A bladder according to claim 10, wherein the extender is selected from the group consisting of ethylene glycol, diethylene glycol, triethylene glycol, tetraethylene glycol, propylene glycol, dipropylene glycol, tripropylene glycol, tetrapropylene glycol, 1,3-propanediol, 1,4-butanediol, 1,6-hexanediol, and mixtures thereof.

12. A bladder according to claim 10, wherein the ratio of equivalents of polyester diol to equivalents of extender is from about 1:1 to about 1:8.

13. A bladder according to claim 1, wherein the fluid barrier material includes a member selected from the group consisting of ethylene vinyl alcohol copolymers, polyvinylidene chloride, acrylonitrile copolymers, polyethylene terephthalate, polyamides, crystalline polymers, polyurethane engineering thermoplastics, and combinations thereof.

14. A bladder according to claim 1, wherein the fluid barrier material comprises an ethylene vinyl alcohol copolymer.

15. A bladder according to claim 14, wherein the ethylene vinyl alcohol copolymer has an ethylene copolymer ratio of from about 25 mole percent to about 50 mole percent.

16. A bladder according to claim 14, wherein the ethylene vinyl alcohol copolymer has an ethylene copolymer ratio of from about 25 mole percent to about 40 mole percent.

17. A bladder according to claim 1, wherein said microlayer polymeric composite includes at least about 50 microlayers.

18. A bladder according to claim 1, wherein said microlayer polymeric composite includes from about 10 microlayers to about 1000 microlayers.

19. A bladder according to claim 1, wherein said microlayer polymeric composite includes from about 50 microlayers to about 500 microlayers.

20. A bladder according to claim 1, wherein the average thickness of each fluid barrier material microlayer is independently up to about 2.5 microns thick.

21. A bladder according to claim 1, wherein the average thickness of each fluid barrier material microlayer is independently from about 0.01 micron to about 2.5 microns thick.

22. A bladder according to claim 1, wherein the average thickness of the microlayer polymeric composite is from about 75 microns to about 0.5 centimeter.

23. A bladder according to claim 1, wherein the average thickness of the microlayer polymeric composite is from about 75 microns to about 0.1 centimeter.

24. A bladder according to claim 1, wherein said membrane is a laminate comprising at least one layer A including an elastomeric polyurethane and at least one layer B including said microlayer polymeric composite.

25. A bladder according to claim 23, wherein said laminate comprises layers A-B-A.

26. A bladder according to claim 23, wherein said laminate comprises layers A-B-A-B-A.

27. A bladder according to claim 1, wherein the microlayer polymeric composite is formed with an outer protective boundary layer.

28. A bladder according to claim 24, wherein said laminate has an average thickness of up to about 0.5 centimeter.

29. A bladder according to claim 24, wherein said layer B has an average thickness of from about 6.35 microns to about 2600 microns.

30. A bladder according to claim 1, wherein said membrane has a nitrogen gas transmission rate of less than about 3 $cc/m^2 \cdot atm \cdot day$.

31. A bladder according to claim 1, wherein said membrane has a nitrogen gas transmission rate of less than about 2 $cc/m^2 \cdot atm \cdot day$.

32. A bladder according to claim 1, wherein inflationary gas is at a pressure of at least about 3 psi.

33. A bladder according to claim 1, wherein inflationary gas is at a pressure of from about 3 to about 50.

34. A bladder according to claim 1, wherein inflationary gas is nitrogen.

35. A shoe, comprising at least one pressurized bladder according to claim 32.

36. A shoe according to claim 35, wherein the bladder is incorporated as a portion of said sole.

37. A shoe according to claim 35, wherein said bladder forms at least a part of an outer surface of said shoe.

* * * * *